(12) United States Patent  (10) Patent No.: US 8,996,037 B2
Chen et al.  (45) Date of Patent: Mar. 31, 2015

(54) WIRELESS COMMUNICATION DEVICE CAPABLE OF PERFORMING ENHANCED FINGERPRINT MAPPING AND LOCATION IDENTIFICATION

(75) Inventors: Anning Chen, Santa Clara, CA (US); Vladimir Belov, Union City, CA (US); Yan Lu, Cupertino, CA (US); Alexander Makovskiy, San Jose, CA (US); Steven Malkos, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/538,780

(22) Filed: Jun. 29, 2012

(65) Prior Publication Data

US 2013/0225209 A1   Aug. 29, 2013

Related U.S. Application Data

(60) Provisional application No. 61/602,999, filed on Feb. 24, 2012.

(51) Int. Cl.
*H04W 24/00* (2009.01)

(52) U.S. Cl.
USPC ............. 455/456.6; 455/552.1; 455/457; 455/446; 370/354; 370/447

(58) Field of Classification Search
None
See application file for complete search history.

(56) References Cited

U.S. PATENT DOCUMENTS

| 2005/0037775 | A1 | 2/2005 | Moeglein et al. |
| 2006/0217130 | A1* | 9/2006 | Rowitch et al. ............ 455/456.1 |
| 2006/0238419 | A1* | 10/2006 | Bucknor et al. ......... 342/357.09 |
| 2008/0014934 | A1* | 1/2008 | Balasubramanian et al. 455/434 |
| 2010/0120422 | A1* | 5/2010 | Cheung et al. ................ 455/434 |
| 2012/0058778 | A1* | 3/2012 | Waters et al. ............. 455/456.1 |
| 2012/0100870 | A1* | 4/2012 | Prost et al. ................. 455/456.1 |

FOREIGN PATENT DOCUMENTS

| KR | 10-2011-0067687 | | 6/2011 | |
| WO | WO 2010/125113 A1 * | 11/2010 | ............... G01S 5/02 |
| WO | WO 2011/019125 A1 | 2/2011 | |

OTHER PUBLICATIONS

Korean Office Action directed to related Korean Patent Application No. 10-2013-0019691, mailed Apr. 24, 2014; 7 pages.
English-Langugage Abstract for PCT Patent Publication No. WO 2011/019125 A1, published Feb. 17, 2011; 2 pages.
English-Language Abstract for Korean Patent Publication No. KR 10-2011-0067687, published Jun. 22, 2011; 1 page.
Office Action directed to related Taiwanese Patent Application No. 102104588, mailed on Oct. 22, 2014; 8 pages.

* cited by examiner

*Primary Examiner* — Rafael Pérez-Gutiérrez
*Assistant Examiner* — Keith Fang
(74) *Attorney, Agent, or Firm* — Sterne, Kessler, Goldstein & Fox PLLC

(57) ABSTRACT

A wireless communication device capable of determining its location in an indoor environment is disclosed. In an indoor environment, a wireless communication device may have insufficient access to GNSS satellites or cellular towers to make an accurate determination as to its location. Therefore, the wireless communication device generates a fingerprint map of the environment by estimating its position and scanning multiple positions within the environment for accessible access points and characteristics. The device stores this information in memory, which it can later refer to for determining its current position.

20 Claims, 9 Drawing Sheets

WIRELESS COMMUNICATION DEVICE CAPABLE OF PERFORMING ENHANCED FINGERPRINT MAPPING AND LOCATION IDENTIFICATION

CROSS-REFERENCE TO RELATED APPLICATIONS

The present application claims the benefit of U.S. Provisional Patent Application No. 61/602,999, filed on Feb. 24, 2012, which is incorporated herein by reference in its entirety.

BACKGROUND

1. Field of Invention

The disclosure relates to wireless communications, and more specifically to a wireless communication device capable of performing enhanced fingerprint mapping and location identification in a wireless communication environment, and corresponding method.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Modern wireless communications devices use any of varying methods to obtain their location. By obtaining its location, the wireless communication device can perform location-specific functions and/or operate location specific applications. In an outdoor environment, the wireless communication device can easily obtain its location through the use of GNSS satellite information. Similarly, triangulation can be easily performed with nearby base stations because those base stations consistently transmit signals at set power levels.

However, in an indoor environment, the device may not have access to GNSS and/or nearby base stations sufficient to make an accurate location determination. Further, although many indoor environments include other communication access points, such as Bluetooth and WiFi, these communication protocols employ fluctuating transmission powers and sleep/hibernate modes. As such, performing conventional location and mapping techniques in an indoor environment may fail to produce accurate results.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
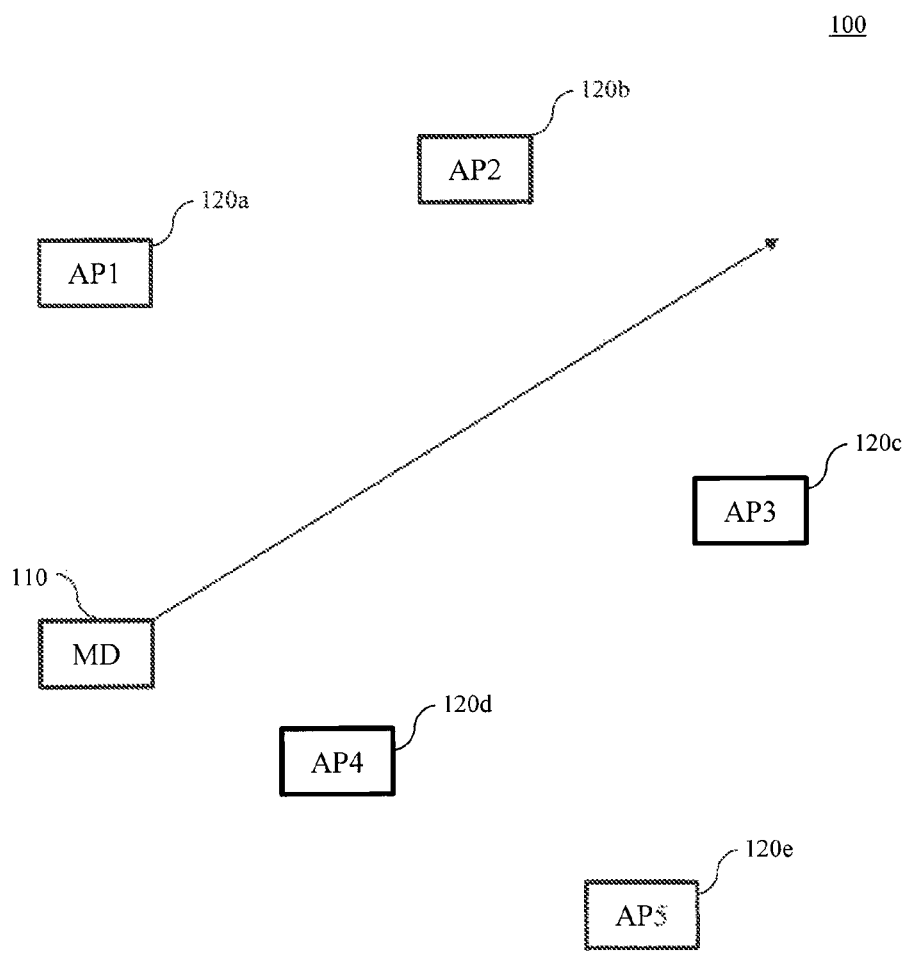
FIG. 1 illustrates a block diagram of an exemplary wireless communication environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of Bluetooth and WiFi environments, those skilled in the relevant art(s) will recognize that this description may also be applicable to other communications that use other wireless communication methods without departing from the spirit and scope of the present disclosure.

An Exemplary Wireless Communications Environment

FIG. 1 illustrates a block diagram of an exemplary wireless communication environment 100. The wireless communication environment may represent an indoor environment, or some other environment where GNSS signals and/or base station signals are unavailable (hereinafter "limited communication environment").

The wireless communication environment 100 includes a plurality of access points (APs) 120a-120e. The access points 120 may be WiFi and/or Bluetooth access points, and may operate at varying transmission power levels depending on one or more of a plurality of different parameters, including whether the access point 120 is in communication with any devices in the wireless communication environment.

The wireless communication environment 100 also includes a mobile device 110 that seeks to determine its position as it moves through the wireless communication environment 100. As discussed previously, because the wireless communication environment 100 is a limited communication environment, the mobile device 110 cannot determine its location using conventional methods.

Figure 2:
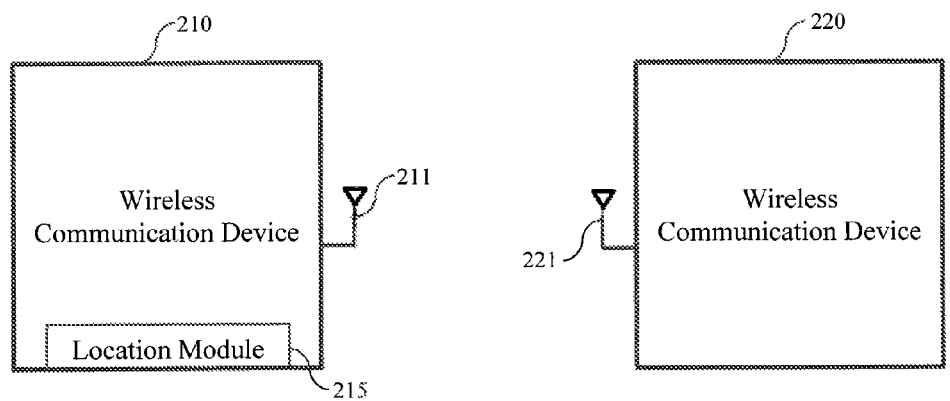
FIG. 2 illustrates a block diagram of an exemplary wireless communication environment that may represent a subset of the previously-described wireless communication environment.

FIG. 2 illustrates an exemplary block diagram of a wireless communication environment 200. The wireless communication environment 200 provides wireless communication of information, such as one or more commands and/or data, between wireless communication devices and may represent a subset of the wireless communication environment 100.

The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 200 includes a first wireless communication device 210 and a second wireless communication device 220. Each of the first wireless communication device 210 and the second wireless communication device 220 may be included within corresponding wireless communication devices that are each capable of both wireless transmission and wireless reception. For purposes of this discussion, the first wireless communication device 210 may represent an exemplary embodiment of the mobile device 110, and the second wireless communication device 220 may represent an exemplary embodiment of an access point 120.

The access point 220 includes an antenna 221 that may include one or more antennas and that is capable of transmitting and/or receiving signals from the wireless communication environment. Using its antenna 221, the access point 220 communicates with the mobile device 210. The mobile device 210 also includes an antenna 211 that may include one or more antennas and that is capable of transmitting and/or receiving signals from the wireless communication environment 200.

The wireless communication device 210 also includes a location module 215. Despite the fluctuating transmission powers employed by the access points 120 within the wireless communication environment 100, the location module 215 is configured to map a particular location based on information collected from the access points 120, and to determine a location of the wireless communication device 210 within the wireless communication environment 100.

Exemplary Mobile Device

Figure 3:
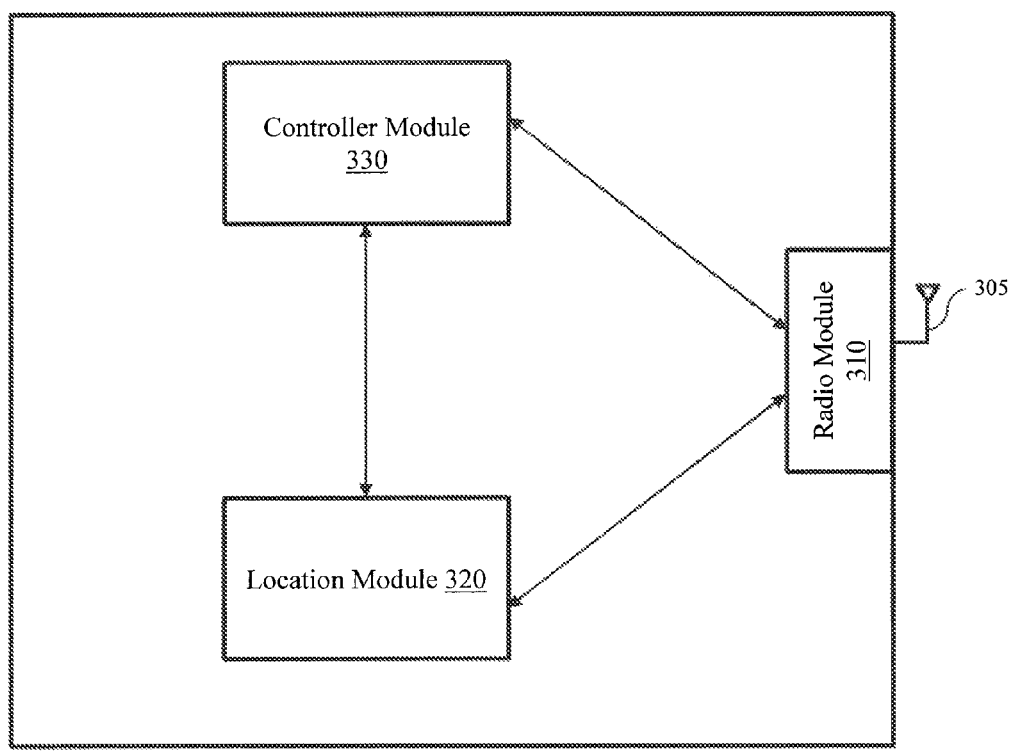
FIG. 3 illustrates a block diagram of an exemplary wireless communication device that may be implemented within the wireless communication environment.

FIG. 3 illustrates a block diagram of an exemplary wireless communication device 300 that may be implemented within the wireless communication environment 100. The wireless communication device 300 includes a location module 320, and may represent an exemplary embodiment of the mobile device 110/210.

In the wireless communication device 300, a radio module 310 performs front-end processing of signals received from the wireless communication environment 100 via the antenna 305 and may include signal amplification, filtering, and frequency mixing. The received signals may include information from one or more nearby access points within the wireless communication environment. Once processed, the radio module 310 forwards the received signals to the location module 320.

The location module 320 is configured to perform mapping and location identification based on the received signals. The configuration of the location module 320 is described in further detail below. The location module 320 is in communication with a controller module 330.

The controller module 330 is configured to perform general processing and control functions within the wireless communication device 300. For example, the controller module 330 may coordinate mapping and/or location identification initiation and timing with the location module 320, may perform general signal processing on received signals, may control operations of the various components of the wireless communication device, may prepare signals for transmission by the radio module 310 to the wireless communication environment, and/or may perform location-specific functions based on the location determined by the location module 320.

Figure 4:
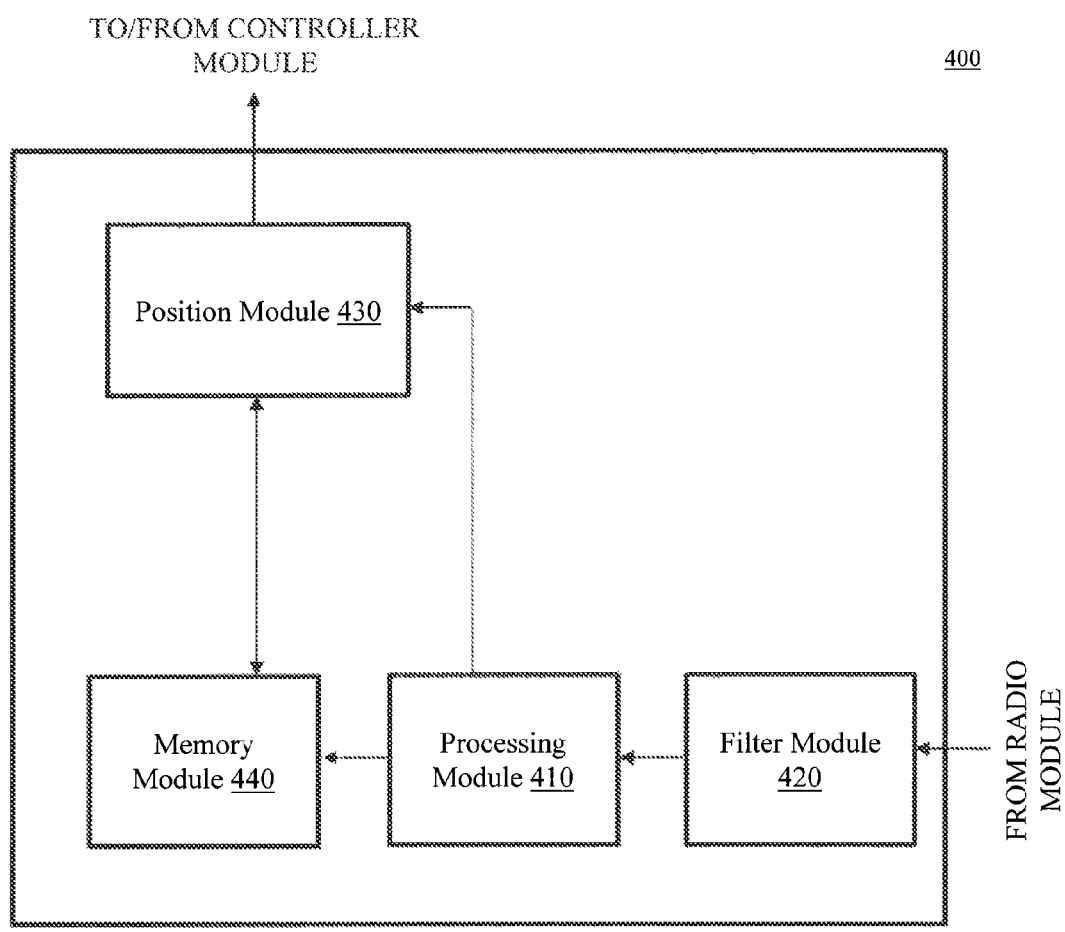
FIG. 4 illustrates an exemplary location module that may be included in the wireless communication device.

FIG. 4 illustrates an exemplary location module 400 that may be included in the wireless communication device 300. The location module 400 includes a memory module 440 and a position module 430, and may represent an exemplary embodiment of the location module 320.

As discussed above, when in a limited communication environment, the mobile device will not have access to traditional location data. Consequently, in order to identify its location, the mobile device first performs data collection within the environment so as to map the environment.

1. Data Collection

As the mobile device moves through the environment, it can interpolate a position estimate by using its last known position as a starting point. However, because of the inherent inaccuracies with estimating its location, the further the device travels in the environment, the further the estimated position strays from a "true" position. An improved position estimation can be found in copending U.S. patent application Ser. No. 13/538,686, filed herewith, titled "Wireless Communications Device Capable of Accurately Performing Position Estimates", which is incorporated herein by reference in its entirety. In the position estimation disclosed therein, the device uses an initial position as the last position at which the device had access to GNSS or other location identification information. Once this information is no longer available, the device employs one or more sensors, such as accelerometers, gyroscopes, and magnetometer, to detect movement speed and direction. Based on the movement information, the device can estimate new positions based on the initial position. Therefore, in order to accurately identify its location within the environment, the mobile device performs data collection and environment mapping, which it can later refer to for location identification.

In order to perform the mapping, the wireless communication device 300 should scan nearby access points at multiple positions within the environment. For example, as the wireless communication device 300 moves through the environment, the position module 430 may interpolate a position estimate of the wireless communication device. When the position module 430 determines that the wireless communication device has traveled a predetermined distance, the position module 430 communicates this to the controller module 330.

In an embodiment, the predetermined distance is a distance from the position at which the most recent scan was taken. In this case, the wireless communication device 300 must be sufficiently far from the position of its previous scan before another scan is performed. In another embodiment, the predetermined distance is simply a travel distance. In this case, the wireless communication device 300 performs a scan after the predetermined distance has been traveled, regardless of how close or far the wireless communication device 300 is to the position at which its most recent scan was performed.

When the controller module 330 receives the notification from the position module 430 that the predetermined distance has been met, the controller module 330 causes the radio module 310 to initiate a scan of the environment. The radio module 310 receives information from all access points within communication range of the wireless communication device 300, and forwards the results to the location module 400.

The location module 400 receives the signals at its filter module 420. The filter module 420 performs various filtering operations on the received information, such as noise filtering, etc. The resulting information is then forwarded to the processing module 410. The processing module 410 extracts desired information from the received signals, and determines various signal characteristics associated with the received signals. For example, the processing module 410 should identify each of the access points included in the received signals. This may be performed by identifying MAC addresses contained in the received signals.

Once the identities of the responding access points have been determined, the processing module 410 determines signal characteristics of the signals corresponding to the identified access points. These signal characteristics any or more of received signal strength indication (RSSI), signal-to-noise ratio (SNR), signal to interference-plus-noise ratio (SINR), as well as any other signal characteristic capable of comparison to similar characteristics. In an embodiment, the processing module 410 determines the RSSI of each access point signal received by the wireless communication device 300 following the scan.

As discussed above, new Bluetooth specifications allows access points to use a wide range of transmission powers, depending on various communication and/or power saving aspects. Therefore, in order to obtain an accurate fingerprint of the current location in a Bluetooth environment, the controller module 330 performs both a passive scan and an active scan.

In the passive scan, the controller module 330 causes the radio module 310 to simply receive passive-mode signals from the access points. Such passive-mode signals do not require the wireless communication device 300 to establish a connection with the access point, but rather to simply receive its beacon signal.

The active scan, on the other hand, requires the wireless communication device 300 to establish a communication link with the nearby access points (which may occur in sequence, simultaneously, and/or overlapping). This active connection allows the wireless communication device to receive higher-power transmission signals from the access points than the passive scan. It should be understood that the active and passive scans may not be necessary for other wireless communication protocols. For example, it may be unnecessary for WiFi access points because the transmission power range specified for WiFi is notably smaller than that for Bluetooth.

The processing module 410 receives the response signals from the nearby access points and determines RSSI information for each of the passive and active responses. After processing, the processing module 410 forwards the access point information to the memory module 440 for storage.

In an embodiment, the received information is stored in two distinct partitions, such as, for example, two separate databases or two separate tables within a single database. The first partition may be organized by location, and is used during a fingerprint location identifying process. As discussed above, the location at the time of the scan is known a priori, using the improved position estimate discussed above. The second partition may be organized by access point identification (e.g., MAC address), and is used during a ranging location identifying process:

TABLE 1

Location Database

| Location | MAC | RSSI | |
|---|---|---|---|
| | | Active | Passive |
| 1 | A | aA1 | pA1 |
| | B | aB1 | pB1 |
| 2 | A | aA2 | pA2 |
| | B | aB3 | pB3 |
| 3 | C | aC3 | pC3 |
| | D | aD3 | pD3 |
| ... | | | |

TABLE 2

Access Point Database

| MAC | Location | RSSI | |
|---|---|---|---|
| | | Active | Passive |
| A | 1 | aA1 | pA1 |
| | 2 | aA2 | pA2 |
| B | 1 | aB1 | pB1 |
| | 3 | aB3 | pB3 |
| C | 3 | aC3 | pC3 |
| D | 3 | aD3 | pD3 |
| ... | | | |

As shown in Table 1, the first database may be organized by location and each location may include multiple identified access points. Further, a given access point may be scanned at more than one location (e.g., MAC B in Table 1 is scanned at locations 2, 3), although it is expected that measured RSSI would vary from one location to the other. Also, although not shown, a particular location may be empty, in that the wireless communication device 300 fails to identify any access points at the particular location. Similarly, Table 2 shows that the second database may be organized by access point (e.g., based on MAC address). Each access point includes the locations at which the access point was identified, as well as the measured signal strengths at those locations.

Although the above Tables are depicted for use in a Bluetooth environment, the wireless communication device 300 can generate fingerprint tables for any other wireless communication protocol within the spirit and scope of the present disclosure. For example, for WiFi access points, the databases would include substantially the same data, but may not require the passive and active RSSIs. Further, the databases may include an additional column for storing a communication "type." This "type" may identify the communication protocol associated with a particular access point, which may then even further enhance the location identification by allowing even more detailed fingerprints.

2. Location Identification

The wireless communication device 300 may perform location identification at any time. Before or during mapping and data collection, new location points in the environment may be determined using the interpolation process described briefly above. However, in most embodiments, the wireless communication device 300 performs location identification using dynamic fingerprinting that is configured to increase accuracy over traditional ranging methods, which are not suited to new Bluetooth transmission power ranges.

At any given time, the wireless communication device may initiate location identification. At that time, the controller module 330 instructs the radio module 310 to scan the current area for nearby access points, similar as during data collection. The radio module 310 forwards the received information to the filter module 420 of the location module 400. After filtering, the filter module 420 forwards the received signals to the processing module 410.

The processing module 410 extracts, from the received signals, identities of nearby access points (e.g., MAC addresses). The processing module 410 also determines the signal characteristics for each of the identified access points. In an embodiment, these signal characteristics are the same as those stored in memory (e.g., RSSI). The processing module 410 forwards the resulting information to the position module 430 for position determination.

After receiving the information from the processing module 410, the position module 430 performs the dynamic fingerprinting. The dynamic fingerprinting involves performing two distinct location identification calculations, and estimating which of the two resulting locations has better accuracy (e.g., by calculating uncertainties relative to each calculation).

Fingerprinting Location Identification

The first of the two location identification calculations is the fingerprinting calculation. The position module 430 performs the calculation using an enhanced weighted k-nearest neighbor algorithm, described in detail below.

Because of the Bluetooth (or semi-Bluetooth) environment, the position module 430 performs several operations on the received information at the forefront. For example, the position module 430 may perform scan filtering to further reduce noise, however this may be performed in advance by the filter module. In addition, the position module 430 performs RSSI scaling in order to account for hardware differences among the access points and the wireless communication device 300. The position module 430 also performs link state identification, which identifies the link states (e.g., whether in active transmission or passive transmission mode) of the identified access points. This may be determined based on the RSSIs of the corresponding access points, and/or other or additional signal information.

With the RSSIs being scaled and the link states identified, the position module 430 possesses an environment fingerprint corresponding to a current location of the wireless communication device 300. The position module 430 then accesses the memory module 440 and correlates the current fingerprint (e.g., one or more current measured RSSIs) with those previously stored. Because the current fingerprint relates to a current location of the wireless communication device, the correlation should be made with respect entries within the Location Database (Table 1).

For example, at the current location, the current fingerprint may detect RSSIs for MACs A and B. The correlation compares the RSSIs for those MACs to previously-stored fingerprints and determines which of those fingerprints includes RSSIs for MACs A and B that are closest to the RSSIs detected at the current location. Because the current location fingerprint includes RSSIs for both MACs A and B, the location that most closely correlates may be location 1 of Table 1, if the current RSSIs are within a predefined range of those stored.

The position module 430 retrieves a plurality of "nearest neighbors" from the memory module 440 based on the correlation. In most locations, for a Bluetooth environment, the number of nearest neighbors is preferably a minimum of 3, and for a WiFi environment, the number of nearest neighbors is preferably a minimum of 5. However, these numbers can be adjusted for different densities of the access points in the scanned area. The nearest neighbors may be determined based solely on the correlation (e.g., the most closely correlated location fingerprints) to the current fingerprint. It should be noted that the correlation accounts for the determined link state, and gives more weight to the stored RSSIs of the identified link state than to the stored RSSIs of the other link state.

Once the nearest neighbors have been determined, the position module 430 weighs the nearest neighbors based on any of a number of factors. In an embodiment, the locations of the neighbors are weighted in accordance with the correlations of the neighbors to the current fingerprint. The position module 430 then performs processing on the weighted locations of the nearest neighbors to arrive at a current location of the wireless communication device 300. For example, in an embodiment, the position module 430 averages the weighted locations to arrive at the current location of the wireless communication device 300.

In one embodiment, the correlation determines the similarity between the current fingerprint and a previous stored fingerprint, where a value of 1 can indicate that the fingerprints are identical and a value of 0 can indicate that the fingerprints are entirely different from each other, as well as any value in between representing the similarity between the current and previously-measured fingerprint. These correlation values can then be multiplied with the corresponding previously-stored nearest-neighbor locations to provide a corresponding weighted locations. The weighted locations can then be averaged to arrive at the estimate of the current location. For example, the respective latitude and longitude of the weighted locations are averaged, where the weighting is applied to the individual latitude and longitudes prior to the averaging of the nearest-neighbor locations. Other weighting methods may be available for providing an intelligent position estimation based on the previously-stored fingerprint locations.

Power Ranging Location Identification

In addition to performing fingerprint location identification, the position module 430 may also perform a power ranging location identification. In one embodiment, the position module 430 performs the power ranging location identification each time the current location of the wireless communication device 300 is sought, and selects a preferred result based on one or more parameters (discussed below). However, the fingerprinting location identification is generally more accurate than the power ranging location identification, provided that the wireless communication device 300 is near previously-fingerprinted locations that are stored in memory. Therefore, in another embodiment, the position module 430 may only perform the power ranging location identification when one or more parameters associated with the fingerprinting location identification exceeds a predetermined threshold so as to subject a certain level of inaccuracy.

In the power ranging location identification, based on the information received from the processing module 410, the position module 430 accesses the memory module 440 and retrieves transmission power information relating to the identified access points. Because the position module 430 seeks information regarding individual access points, the information should preferably be retrieved from the Access Point Database (Table 2).

The position module 430 then compares the current detected power levels of the identified access points to stored maximum power levels of those access points. Based on the differences between the current detected power levels and the previously-stored power levels of the access points, the position module 430 can determine a position of the wireless communication device. In other words, since signal level attenuates over distance, the wireless communication device 300 can compare the measured signal strengths of detected access points at its current location to the stored maximum signal strengths of those access points. From this information, the wireless communication device 300 can estimate its distance from each of those access points. By knowing the distance from the access points and the locations of those access points, the wireless communication device 300 can estimate its location using triangulation, by determining the point at which the distances overlap each other, or using any other method that is now or will be known.

Location Selection

When both the fingerprinting location and the power ranging location are determined, the position module 430 must select the result that it deems more accurate. In order to make this selection, the position module 430 determines an uncertainty of each of the location results.

In the fingerprinting location identification, the uncertainty may be based on the correlations between the stored fingerprints and the current fingerprint. For example, if the current fingerprint is very similar to one or more of the stored fingerprints, the uncertainty may be low. On the other hand, if the current fingerprint is only loosely correlated with the most similar stored fingerprints, the uncertainty may be high. Similarly, the uncertainty of the power ranging location identification may be based on the difference between the current detected power levels of the access points and the stored power levels.

The position module 430 compares the resulting uncertainty levels to each other in order to determine which location result is deemed to be "more accurate." For example, the position module 430 may select the location result having the least uncertainty as the final location.

Figure 5:
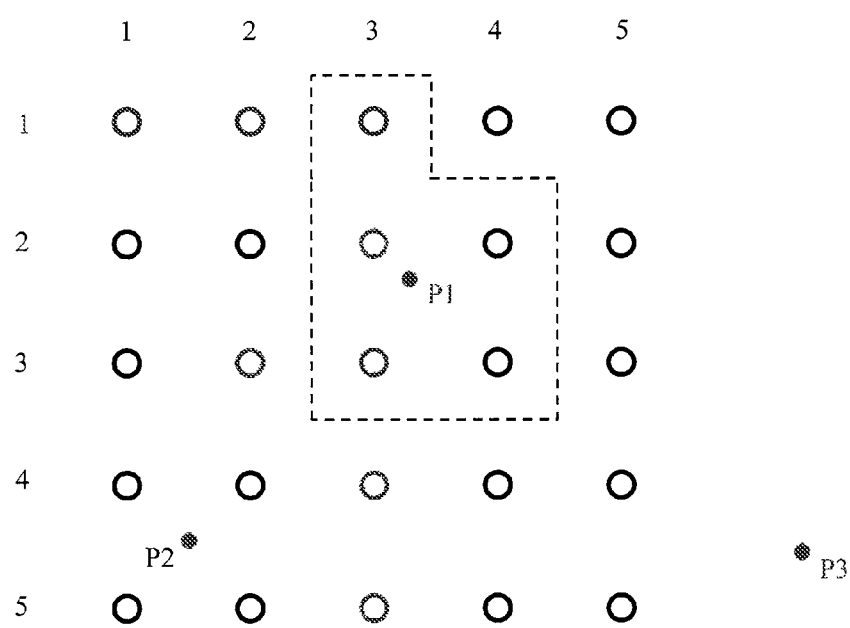
FIG. 5 illustrates an exemplary location map that may be generated and used by the location module.

FIG. 5 illustrates an exemplary location map that may be generated and used by the location module 400. The location map includes 25 fingerprints that were previously stored in the memory module 440. For exemplary purposes, the fingerprints are arranged in a grid, and are references below as (column number, row number).

At a first position P1, the position module 430 performs the fingerprinting location identification technique. Based on the correlations with the stored fingerprints, the five nearest neighbors (for a Bluetooth environment) are the fingerprints at locations (3, 1), (3, 2), (3, 3), (4, 2) and (4, 3). Even without weighting the stored locations, the average of the nearest neighbors would place the location of the device at (3.4, 2.2), which is extremely close to the actual position of the device, as shown in FIG. 5. Using weighting, location (3, 2) would likely be weighted slightly higher and location (3, 1) slightly lower, which may even more closely locate the device.

Further, because the device is particularly close to at least location (3, 2), the devices current fingerprint will likely be sufficiently close to the stored fingerprint of location (3, 2)

that the uncertainty will not exceed the predetermined threshold. As a result, it may not be necessary to perform power ranging.

At a second position P2, the position module 430 again performs the fingerprinting location identification technique. However, because the device is not nearest to any one of the neighboring locations, the current fingerprint may not closely correlate with those fingerprints. In this case, the position module 430 may determine a larger uncertainty that exceeds the predetermined threshold. The position module 430 then proceeds to perform power ranging. Once the power ranging has been performed, the position module 430 compares uncertainties in order to select a final location of the device.

At a third position P3, the position module performs the fingerprinting location identification technique. However, because all of the nearest neighbors are a significant distance away (and all located in one general region) from the device, the uncertainty will be particularly high (and the accuracy will be very low). As a result, the position module 430 performs the power ranging method. In this case, because the device is located so far from the map, the power ranging technique will likely have a lower uncertainty, and its location result is therefore selected by the position module 430.

Once the position module 430 has selected a final position for the device, the position module 430 outputs this result to the controller module 330. The controller module 330 may report this location to the user, or apply the location in a location-specific application, instruction, etc.

3. Cooperative Data Usage

Many of the functions and features described above can be significantly enhanced through device cooperation within the environment.

For example, because a device does not have access to accurate location information while in the environment while preparing the map, the device must rely on various estimation methods to estimate its location. Because the device starts with a known location, a position near an entrance to the environment may have a high accuracy. Unfortunately, due to inherent errors in the estimation process, the accuracy will degrade the further the device travels in the environment.

Therefore, in one embodiment, the wireless communication device 300 can reinitialize its location when it detects a high correlation between a current fingerprint and a previously-stored fingerprint. In other words, when the device detects a current location has already been fingerprinted, the device can set its current location to the previously-stored (and likely more accurate) location. In this manner, the wireless communication device 300 can generate a more accurate fingerprint map.

Expanding on this idea, in another embodiment, mapping data from the wireless communication device 300 can be uploaded to a server in the environment via one or more of the access points. This data may then be combined with similar data uploaded from other similar devices. At the same time, other wireless communication devices can be initializing their positions at various times to the data stored on the server. By collecting data from several devices, and using that data to make future data more accurate, the accuracy of the data maps will increase exponentially until it is extremely close to actual location information.

Exemplary Method of Mapping Environment

Figure 6:
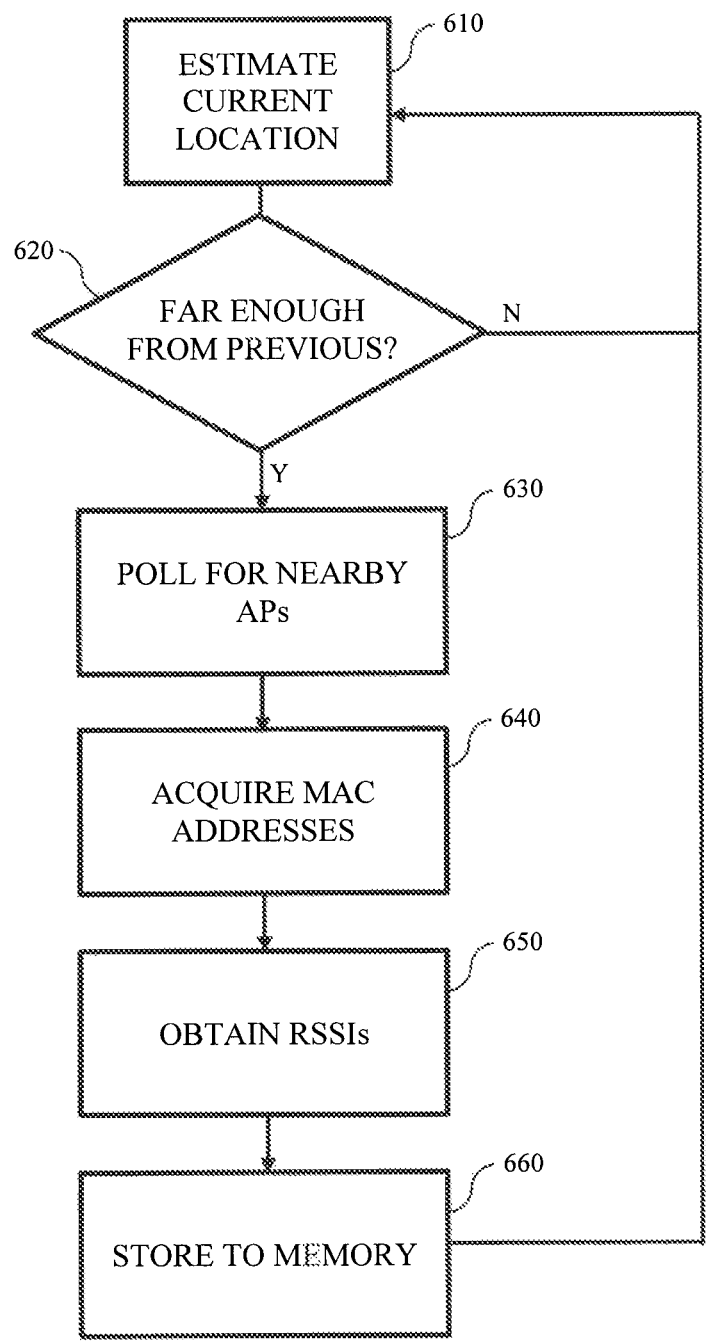
FIG. 6 illustrates a block diagram of an exemplary method for collecting data within the wireless communication environment.

FIG. 6 illustrates a block diagram of an exemplary method for collecting data within the wireless communication environment by a wireless communication device.

In the method, the device moves through the environment while estimating its current location (610). The device compares its current estimated position to previous position at which the device, or another device, took a fingerprint (620). If the device has not yet taken a fingerprint, it may compare its current estimated location to its previously known location, such as a last GPS location. If the device has not traveled sufficient distance from its previous location (620-N), the device continues its location estimation.

If the device determines that it has traveled sufficient distance from its previous location (620-Y) the device scans its current location for nearby access points (630). From the information received from the scan, the device determines identifying information of the nearby access points, such as MAC addresses (640). The device then determines signal characteristics associated with the signals of the identified access points, such as RSSI (650).

The device then stores this information in memory (660). In an embodiment, this information may be stored in two tables or databases that include a location database and an access point database. Once the information has been stored to memory, the device continues to estimate its current location (610) and repeat the method.

Those skilled in the relevant art(s) will recognize that the above method can additionally or alternatively include any of the functionality of the wireless communication device 300 discussed above, as well as any of its modifications. Further, the above description of the exemplary method should neither be construed to limit the method nor the description of the wireless communication module 300.

Figure 7:
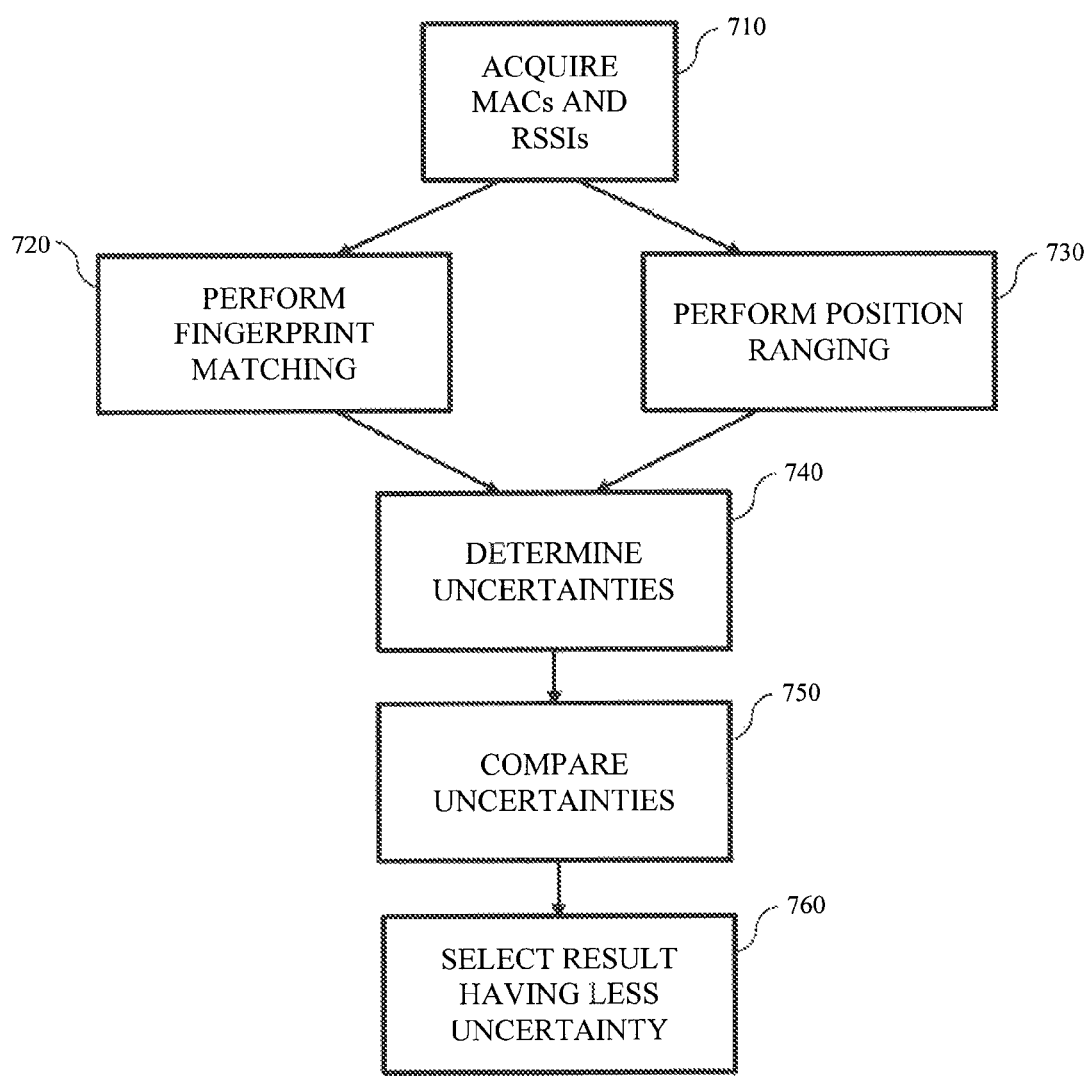
FIG. 7 illustrates a block diagram of an exemplary method for performing location determination by the wireless communication device.

Exemplary Method of Identifying a Location of a Device within a Communication Environment FIG. 7 illustrates a block diagram of an exemplary method for performing location determination by the wireless communication device.

In order to determine its current location, the device first scans the environment at its current position and identifies access points and signal characteristics of the response (710). Once obtained, the device performs fingerprint location identification (720), as further detailed in FIG. 8.

Figure 8:
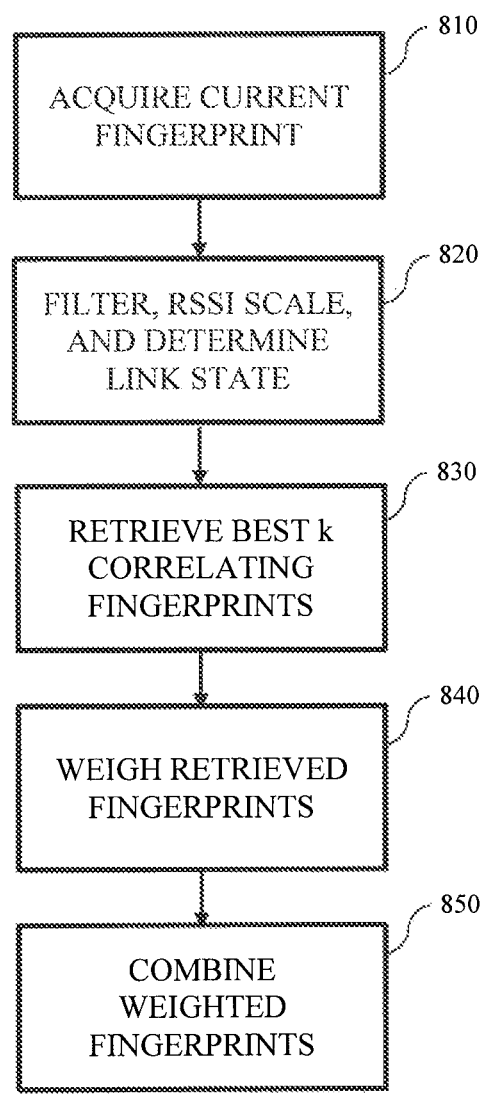
FIG. 8 illustrates a block diagram of an exemplary method for performing fingerprint location identification by the wireless communication device.

FIG. 8 illustrates a block diagram of an exemplary method for performing fingerprint location identification by the wireless communication device.

Once the fingerprint has been obtained (810, 710), the device performs various processing on the information (820), including filtering, RSSI scaling (to account for hardware differences), and link stat determination (to determine whether a particular access point is in an active or passive state). The device then retrieves the k nearest neighbors from memory (830). These nearest neighbors may be previously-stored fingerprints that most closely correlate with the current fingerprint. For Bluetooth, k should be set to a minimum of 3, whereas WiFi should have a k value of at least 5.

The device then weighs the retrieved fingerprints based on one or more criteria (840). For example, the fingerprints may be simply based on their correlation to the current fingerprint. Once weighted, the device combines the results in some manner so as to arrive at the location of the device (850). This may be achieved, for example, by simply averaging the latitudes and longitudes of the weighted fingerprints.

Returning to FIG. 7, the device also may perform power ranging location identification (730). The power ranging may be performed in sequence with, or simultaneous (as shown) with the fingerprint matching. In addition, the power ranging may only be performed when one or more conditions have been met, such as an uncertainty of the fingerprint location result exceeding a predetermined threshold.

Once locations have been determined using both fingerprint matching and power ranging, the device determines uncertainties for each of the determined locations (740).

These uncertainties are then compared to one another (750). Finally, the device selects the location resulting from the method having the least uncertainty (760). This location is determined to be the location of the device in the environment.

Those skilled in the relevant art(s) will recognize that the above method can additionally or alternatively include any of the functionality of the wireless communication device 300 discussed above, as well as any of its modifications. Further, the above description of the exemplary method should neither be construed to limit the method nor the description of the wireless communication device 300.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
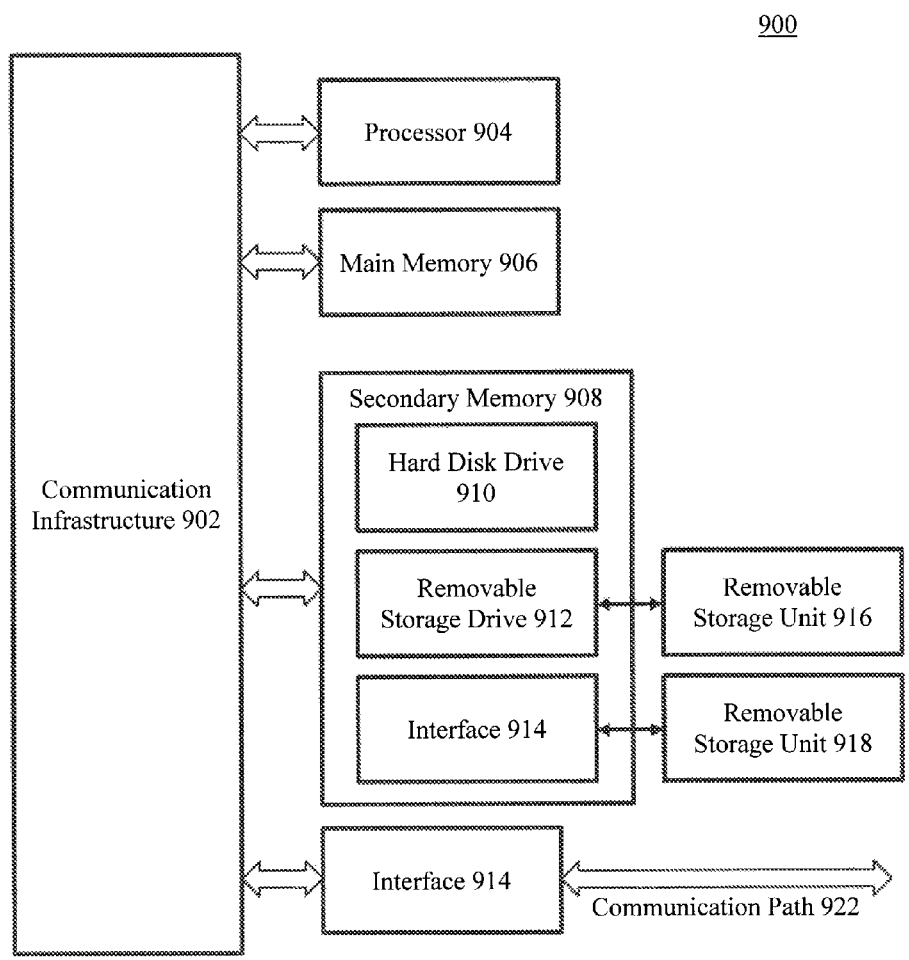
FIG. 9 illustrates an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. One or more of the modules depicted in the previous figures can be at least partially implemented on one or more distinct computer systems 900, including, for example, the location module 320/400.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCMCIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A wireless communication device configured to determine a current location within a limited communication environment having a plurality of access points, the wireless communication device comprising:
   a radio module configured to scan the limited communication environment at a plurality of locations for nearby access points, and receive signals in response to the scan from the nearby access points;
   a processing module configured to receive the signals from the radio module, identify the nearby access points included in the received signals, and determine at least one signal characteristic corresponding to each of the identified nearby access points;
   a memory that stores the identified nearby access points and their corresponding at least one signal characteristic in a first database, and in a second database that is organized differently than the first database; and
   a position module configured to determine the current location of the wireless communication device using a first location identification algorithm based on the first database, and configured to conditionally determine the current location of the wireless communication device using a second location identification algorithm based on the second database,
   wherein the first location identification algorithm is one of a weighted k-nearest neighbor algorithm or a power ranging algorithm, and
   wherein the second location identification algorithm is the other of the weighted k-nearest neighbor algorithm or the power ranging algorithm that is not used as the first location identification algorithm.

2. The wireless communication device of claim 1, wherein the memory stores the identified nearby access points and their corresponding at least one signal characteristic together in relation to an estimated location of the wireless communication device at the time the scan was performed.

3. The wireless communication device of claim 2, wherein the first database is organized by estimated location, and lists each identified nearby access point and the corresponding at least one signal characteristic identified at each estimated location, and
   wherein the second database is organized by access point, and lists the corresponding at least one signal characteristic and estimated locations of each access point.

4. The wireless communication device of claim 1, wherein the position module is further configured to perform received signal strength indication (RSSI) scaling for signals received from nearby access points identified as Bluetooth access points.

5. The wireless communication device of claim 1, wherein the scan includes a passive scan to receive passive-mode signals from at least one of the nearby access points and an active scan to receive active-mode signals from the at least one of the nearby access points,
   wherein the at least one signal characteristic includes an active-mode received signal strength indication (RSSI) based on signals received during the active scan and a passive-mode RSSI based on signals received during the passive scan.

6. A wireless communication device configured to determine a current location within a limited communication environment having a plurality of access points, the wireless communication device comprising:
   a memory that stores a plurality of wireless communication fingerprints of the limited communication environment in a database, each wireless communication fingerprint including identification information of the plurality of access points, at least one signal characteristic of each of the plurality of access points, and estimated locations at which each of the plurality of access points is detected; and
   a position module configured to determine a first current location of the wireless communication device using a first location identification algorithm and to determine a second current location of the wireless communication device using a second location identification algorithm based on the wireless communication fingerprints stored in the memory, the position module being further configured to select one of the first current location or the second current location as the current location of the wireless communication device based on at least one parameter,
   wherein one of the first location identification algorithm or the second location identification algorithm is a weighted k-nearest neighbor algorithm,
   wherein the position module is configured to determine types of each of the access points, and
   wherein the position module sets a number of neighbors to be used in the first location identification algorithm based on the determined types of the access points.

7. The wireless communication device of claim 6, wherein the at least one parameter includes an uncertainty of the first current location.

8. The wireless communication device of claim 7, wherein the position module is further configured to perform the second location identification algorithm only when the uncertainty exceeds a predetermined threshold.

9. The wireless communication device of claim 7, wherein the position module is further configured to calculate an uncertainty of the second current location, and
   wherein the position module is further configured to select, as the current location, the one of the first current location or the second current location that has a smaller uncertainty.

10. The wireless communication device of claim 7, further comprising calculating the uncertainty based on a current fingerprint and stored fingerprints associated with the first current location and the second current location.

11. The wireless communication device of claim 10, wherein the calculating of the uncertainty includes:
    correlating the current fingerprint with a stored first current location fingerprint to determine a first correlation; and
    correlating the current fingerprint with a stored second current location fingerprint to determine a second correlation.

12. The wireless communication device of claim 6, wherein the position module is further configured to set the number of neighbors to at least 3 when the access points are determined to be Bluetooth access points, and to at least 5 when the access points are determined to be WiFi access points.

13. The wireless communication device of claim 6, wherein the position module is further configured to determine a current wireless communication fingerprint of the limited communication environment,
    wherein the position module is further configured to determine link states of the access points included in the current wireless communication fingerprint,
    wherein the position module is further configured to correlate the current wireless communication fingerprint with the plurality of stored wireless communication fingerprints based on the link states, and wherein the position module is further configured to identify the nearest neighbors as the stored wireless communication fingerprints that most closely correlate with the current wireless communication fingerprint.

14. The wireless communication device of claim 13, wherein the position module is further configured to weigh locations of the nearest neighbors based on their correlation with the current wireless communication fingerprint, and
wherein the position module is further configured to determine the first current location of the wireless communication device by averaging the weighted locations of the nearest neighbors.

15. A method for determining a location of a wireless communication device in a limited communication environment, the method comprising:
storing a plurality of wireless communication fingerprints corresponding to a plurality of locations within the limited communication environment, the wireless communication fingerprints including identified access points and signal characteristics associated with the identified access points;
acquiring a current location fingerprint corresponding to a wireless communication fingerprint of a current location of the wireless communication device;
calculating a first location using a first location identification algorithm based on the current location fingerprint and at least one of the stored wireless communication fingerprints;
conditionally calculating a second location using a second location identification algorithm depending on at least one parameter associated with the first location identification algorithm;
correlating the current location fingerprint with the stored plurality of wireless communication fingerprints; and
selecting a plurality of nearest neighbors from among the stored wireless communication fingerprints for use in the first location identification algorithm based on the correlation,
wherein one of the first location identification algorithm or the second location identification algorithm is a weighted k-nearest neighbor algorithm.

16. The method of claim 15, wherein the storing of the plurality of wireless communication fingerprints includes storing the plurality of wireless communication fingerprints in a first database having a first data arrangement and storing the plurality of wireless communication fingerprints in a second database having a second data arrangement.

17. The method of claim 16, further comprising:
weighing locations of each of the selected plurality of neighbors based on the correlation; and
calculating the first location by averaging the weighted locations.

18. The method of claim 15, further comprising:
calculating an uncertainty associated with the first location; and
comparing the uncertainty to a predetermined threshold,
wherein the second location is calculated only when the uncertainty exceeds the predetermined threshold.

19. The method of claim 18, wherein the calculating of the uncertainty associated with the first location is performed based on the current location fingerprint and a first one of the stored plurality of wireless communication fingerprints that is associated with the first location.

20. The method of claim 19, wherein the calculating of the uncertainty associated with the first location includes correlating the current location fingerprint with the first one of the stored plurality of wireless communication fingerprints.

* * * * *